United States Patent
Nakatani et al.

(10) Patent No.: US 7,123,246 B2
(45) Date of Patent: Oct. 17, 2006

(54) DISPLAY DEVICE

(75) Inventors: Hironori Nakatani, Kyoto (JP); Yasuyuki Watanabe, Uji (JP); Akira Sakamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 527 days.

(21) Appl. No.: 10/123,192

(22) Filed: Apr. 17, 2002

(65) Prior Publication Data

US 2003/0020699 A1 Jan. 30, 2003

(30) Foreign Application Priority Data

Jul. 27, 2001 (JP) ............................. 2001-228567

(51) Int. Cl.
*G09G 5/00* (2006.01)
(52) U.S. Cl. .................... 345/204; 345/42; 345/87; 345/89; 345/98; 345/100; 348/699
(58) Field of Classification Search ............... 345/204, 345/87, 98, 99, 100, 89, 42; 348/699
See application file for complete search history.

(56) References Cited

U.S. PATENT DOCUMENTS

| 4,710,680 | A | | 12/1987 | Nakatani et al. |
|---|---|---|---|---|
| 4,823,121 | A | | 4/1989 | Sakamoto et al. |
| 4,862,153 | A | | 8/1989 | Nakatani et al. |
| 4,985,663 | A | | 1/1991 | Nakatani |
| 5,124,691 | A | | 6/1992 | Sakamoto et al. |
| 5,148,300 | A | | 9/1992 | Mizushima et al. |
| 5,309,150 | A | | 5/1994 | Ohba et al. |
| 5,546,104 | A | * | 8/1996 | Kuga ........................... 345/99 |
| 5,627,667 | A | | 5/1997 | Mizushima et al. |
| 5,812,149 | A | | 9/1998 | Kawasaki et al. |
| 6,127,993 | A | | 10/2000 | Ohba et al. |
| 6,329,973 | B1 | * | 12/2001 | Akimoto et al. ............... 345/98 |
| 6,350,557 | B1 | | 2/2002 | Aomori et al. |
| 6,888,517 | B1 | * | 5/2005 | Ikemoto ....................... 345/67 |
| 2002/0018058 | A1 | * | 2/2002 | Tamura |
| 2002/0145618 | A1 | | 10/2002 | Okuno et al. |

FOREIGN PATENT DOCUMENTS

| EP | 0655725 A1 | 5/1995 |
|---|---|---|
| EP | 1239448 A2 | 9/2002 |
| JP | 07-121133 | 5/1995 |
| JP | 2000-221923 | 8/2000 |
| JP | 2001-175218 A | 2/2001 |
| KR | 1999-0072530 A | 9/1999 |
| KR | 2001-0015247 A | 2/2001 |

* cited by examiner

*Primary Examiner*—Richard Hjerpe
*Assistant Examiner*—Jennifer T. Nguyen
(74) *Attorney, Agent, or Firm*—Birch, Stewart, Kolasch & Birch, LLP

(57) ABSTRACT

The invention provides a display device which is capable of adjusting the image refresh rate to an optimal value regardless of the type of image data, and thus has low power consumption. The display device includes a liquid crystal panel for displaying images, a liquid crystal controller for refreshing images displayed in the liquid crystal panel according to an image data signal, and a CPU for inputting the image data signal to the liquid crystal controller. In the display device, the CPU has a discrimination section for discriminating whether the image data is a moving image or a still image based on an input interval of the image data from the CPU to the liquid crystal controller, and the liquid crystal controller has an image refresh demand signal generation circuit for changing the image refresh rate of the liquid crystal panel based on the result of discrimination by the CPU.

15 Claims, 8 Drawing Sheets

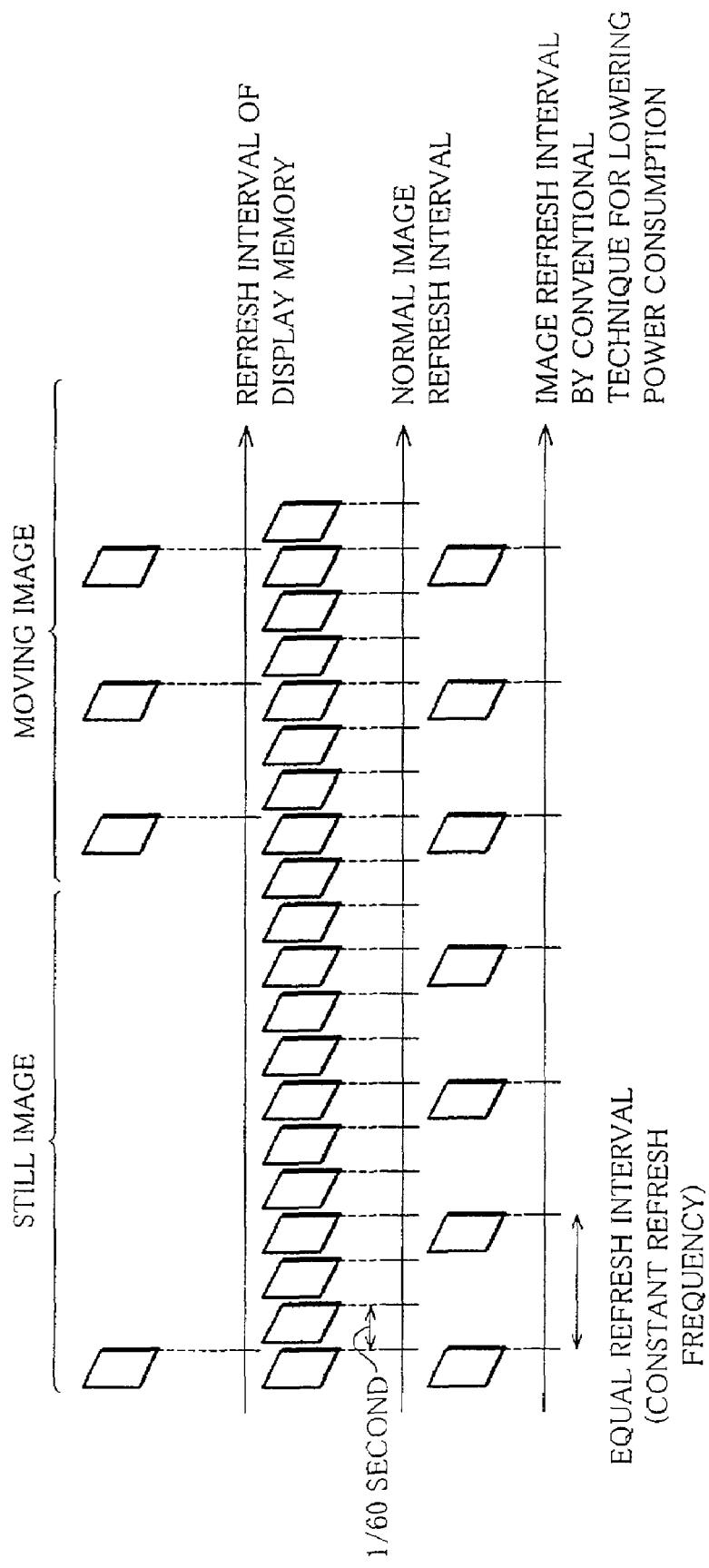

DISPLAY DEVICE

FIELD OF THE INVENTION

The present invention relates to a display device which is equipped with a capacitive display element, such as a liquid crystal display element, and in particular to a display device which is capable of varying its image refresh intervals of the capacitive display element so as to reduce power consumption.

BACKGROUND OF THE INVENTION

In recent years, a liquid crystal display element is used in various fields as a display element for displaying images. The liquid crystal display element is mainly used for portable electronic devices, and for this type of devices, the major demand is to further reduce power consumption.

Meanwhile, portable electronic devices, especially a mobile phone, are now more often used for transmitting data having large volume of information such as moving image data at high speed, with the development of communication technology. The image refresh frequency (refresh rate; the number of refreshes of a displayed image in unit time) tends to increase in the liquid crystal display element which is used for a mobile phone so as to process such a large volume of information. This tendency is especially remarkable in the case of displaying a moving image. On the other hand, in the case of displaying a still image, it is not necessary to refresh images at a frequency as high as that when displaying a moving image. This is because a display element (a capacitive display element), which is made up of capacitive pixels such as a liquid crystal display element, is capable of holding a displayed state (display image) for a certain period of time once the image is refreshed by externally receiving image data of a pixel unit so that it is not required to refresh images. Note that, the time period of holding the displayed state differs depending on the characteristic of the capacitive display element.

Here, as an example of a conventional display device, the following will explain a display device having a liquid crystal panel 103 as a display element, with reference to the block diagram of FIG. 7.

As shown in FIG. 7, the conventional display device includes a liquid crystal controller 102, and the liquid crystal panel 103 as a display element. The liquid crystal controller 102 includes a display memory 104, a signal synchronization circuit 105, a display timing generation circuit 106, and a data bus 107.

An image data signal S101 which is outputted from an external device such as a CPU is stored in the display memory 104 in the liquid crystal controller 102 via the data bus 107 of the liquid controller 102. The image data signal S101 which is stored in the display memory 104 is read out therefrom as an image data signal S103, and then is sent to the signal synchronization circuit 105.

Meanwhile, a clock signal CK101 is externally inputted to the display timing generation circuit 106 of the liquid crystal controller 102. The display timing generation circuit 106, according to the clock signal CK101, generates a display signal S105 for driving the liquid crystal panel 103, and a synchronization clock signal CK102 for synchronizing the image data signal S103 with the display signal S105. The display timing generation circuit 106 respectively outputs the display signal S105 to the liquid crystal panel 103, and the synchronization clock signal CK102 to the signal synchronization circuit 105. The signal synchronization circuit 105 buffers the image data signal S103 read out from the display memory 104, and outputs the image data signal S103 to the liquid crystal panel 103 as an image signal S104, according to the synchronization clock signal CK102 outputted from the display timing generation circuit 106.

In the foregoing conventional display device, the refresh rate of the liquid crystal panel 103 corresponds to the rate of reading out image data from the display memory 104 and sending the image data to the liquid crystal panel 103 as the image data signal S103, namely, it is the value indicating how many times image signals of one frame (a screen) are sent out from the display memory 104 to the liquid crystal panel 103 in unit time.

Further, in the foregoing conventional display device, the image refresh frequency (refresh intervals) of the liquid crystal panel 103 can be adjusted by varying the frequency of the clock signal CK101 so as to vary the frequency of the display signal S105 which is outputted from the display timing generation circuit 106 of the liquid crystal controller 102 to the liquid crystal panel 103, and the frequency of the image signal S104 which is outputted from the signal synchronization circuit 105 to the liquid crystal panel 103.

However, in the foregoing conventional display device, the image refresh frequency of the liquid crystal panel 103 is constant regardless of whether the image data signal S101 is carrying a moving image or a still image, thereby causing the following problems.

Referring to "normal image refresh intervals" shown in FIG. 8, the image refresh frequency of the liquid crystal panel 103 is commonly set to a relatively high frequency, for example, 60 Hz, which is equal to a frame frequency of a video signal in the NTSC mode, to be suitable for displaying a moving image. In this case, even when a still image is displayed, the image is refreshed in the refresh frequency as high as that when displaying a moving image.

On the other hand, in the liquid crystal panel 103, the displayed images are not required to be refreshed at a high frequency when displaying a still image compared to the case of displaying a moving image. This is because, as already explained, the capacitive display element such as the liquid crystal panel 103 can hold a displayed state (displayed image) for a certain period of time once the image is refreshed, and, when displaying a still image, it is not necessary to refresh the image while the displayed image is held. Therefore, in the foregoing conventional liquid crystal display device, the image refresh frequency for displaying a still image is higher than required.

Thus refreshing images at a frequency higher than required when displaying a still image causes unnecessary power consumption, since the power consumption of the liquid crystal panel 103 increases as the image refresh frequency increases. Namely, in general, when displaying images in the liquid crystal panel 103, power consumption P, which is the power consumed for displaying images in the liquid crystal panel 103, is denoted by the following equation:

$$P = C \times F \times V^2$$

where C represents a capacitance of the liquid crystal panel 103, F represents a polarity reversing frequency of scanning voltage which is applied to the liquid crystal panel 103, and V represents a voltage applied to the liquid crystal panel 103. The polarity of the scanning voltage is reversed for a specified number of times (the number depends on the mode of driving) in one frame period. Accordingly, the polarity reversing frequency of scanning voltage varies depending on the image refresh frequency for the displayed image. Consequently, the power consumption of the liquid crystal panel 103 increases as the image refresh frequency for the displayed image increases, in other words, as the number of refreshes of the displayed image increases.

As a result, when the image refresh frequency of the liquid crystal panel 103 is set to a frequency corresponding to the frame frequency of a moving image, the liquid crystal panel 103 consumes unnecessary power when displaying a still image, and the power consumption of the display device increases. This poses a problem especially for a battery-powered display device such as a display device used for a mobile phone whose power consumption is expressly required to be reduced.

Further, in order to reduce the power consumption, the number of image refreshes, i.e., the image refresh frequency may be reduced by extending a period of the clock signal CK101. However, referring to "a conventional technique for lowering power consumption" shown in FIG. 8, if the image refresh interval is matched with the frame period of a moving image, a still image is also refreshed at a frequency higher than required. Thus, it is not possible to reduce the power consumption for displaying a still image. Further, the image refresh interval may be reduced to be shorter than the frame period of a moving image; however, it may impair smoothness of the movement of the moving image.

Further, in Japanese Unexamined Patent Publication No. 2000-221923 (published on Aug. 11, 2000), a liquid crystal display device capable of changing the image refresh frequency (refresh rate) based on time information (time reference) which is included in externally inputted image data, is disclosed. Further, a liquid crystal display device capable of reducing the image refresh frequency (extending the refresh interval) in the case where image data does not include a textual image, is also disclosed in this publication.

However, the former invention of the foregoing publication is based on time information included in image data having a particular data structure called MPEG-4 format, and it is not applicable to image data which does not have the time information. This time information is included in compressed image data for indicating a timing to display a frame in MPEG-4 format which performs data compression by thinning out some frame. Thus, the time information is only included in image data of MPEG-4 format and not included in common image data. Accordingly, the former invention of the foregoing publication have a drawback that it is applicable only to the compressed image data of MPEG-4 format, and not applicable to other kinds of image data.

Note that, image data commonly assumed is color signals of R, G and B which are expressed by digital signals, and each pixel has values for R, G and B. For example, in the case of image data of 16 bits, R, G and B are respectively expressed by 5 bits, 6 bits and 5 bits.

Further, in the latter invention of the foregoing publication, in the case where the image data is moving image data which does not include a textual image, or still image data including a textual image, there arises the following problems. Firstly, in this invention, when the moving image data which does not include a textual image is inputted, the image refresh frequency becomes lower than the intended frame frequency (a frame frequency for the inputted moving image data), and smoothness of the movement of the moving image is impaired. Secondly, when the still image data including a textual image is inputted, the image refresh frequency becomes higher than required, thereby causing unnecessary power consumption.

SUMMARY OF THE INVENTION

It is an object of the present invention to provide a display device capable of adjusting an image refresh rate to an optimal value regardless of the type of image data so as to reduce power consumption.

In order to attain the foregoing object, a display device according to the present invention includes:

a capacitive display element which displays an image;

a display control section which refreshes an image displayed in the capacitive display element according to image data;

an image data input section which inputs the image data to the display control section;

a discrimination section which discriminates a type of the image data (especially, the image data is a still image or a moving image) based on an input time interval of the image data from the image data input section to the display control section; and a refresh rate control section which changes an image refresh rate of the image in the capacitive display element, according to a result of discrimination by the discrimination section.

In the foregoing arrangement, the input of the image data from the image data input section to the display control section is performed in a relatively short period of time, for example, $\frac{1}{20}$ to $\frac{1}{15}$ second in the case of a moving image. On the other hand it is performed only once in the case of a still image. In the foregoing arrangement, the type of image data is discriminated according to a difference of input interval of the image data from the image data input section to the display control section, which differs depending on the type of the image data. Consequently, it becomes possible to discriminate the type of the image data even when time information is not included in the image data.

With the foregoing arrangement, it is therefore possible to adjust the number of image refreshes in unit time (image refresh rate) in the capacitive display element to an optimal value according to the type of image data, without depending on the image data. Namely, it is possible to adjust an image refresh interval (image refresh timing) in the capacitive display element, to an optimal value according to the type of image data, without depending on the image data. Thus, unnecessary image refresh operations, especially in the case of displaying a still image, can be prevented, thereby reducing power for driving the capacitive display element. As a result, it becomes possible to provide a display device capable of reducing power consumption regardless of the type of image data.

Note that, in the present invention, "refreshing an image" refers to sending out an image signal of one frame to a capacitive display element, such as a liquid crystal display element, and applying a driving voltage to the pixels of the capacitive display element. Accordingly, "the number of image refreshes" corresponds to the number of times the image signal of one frame is sent out to the capacitive display element. Further, "frame" refers to an image signal (image data) of one screen. Further, "frame frequency" indicates the number of transferred frames per second when the image data is transferred, and "frame period" indicates a transfer period of frame when the image data is transferred.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 is a diagram showing a variation of the number of frames (number of refreshes) of an image signal in the conventional display device.

DESCRIPTION OF THE EMBODIMENTS

[First Embodiment]

The following will explain one embodiment of the present invention with reference to FIGS. 1 through 4.

Figure 1:
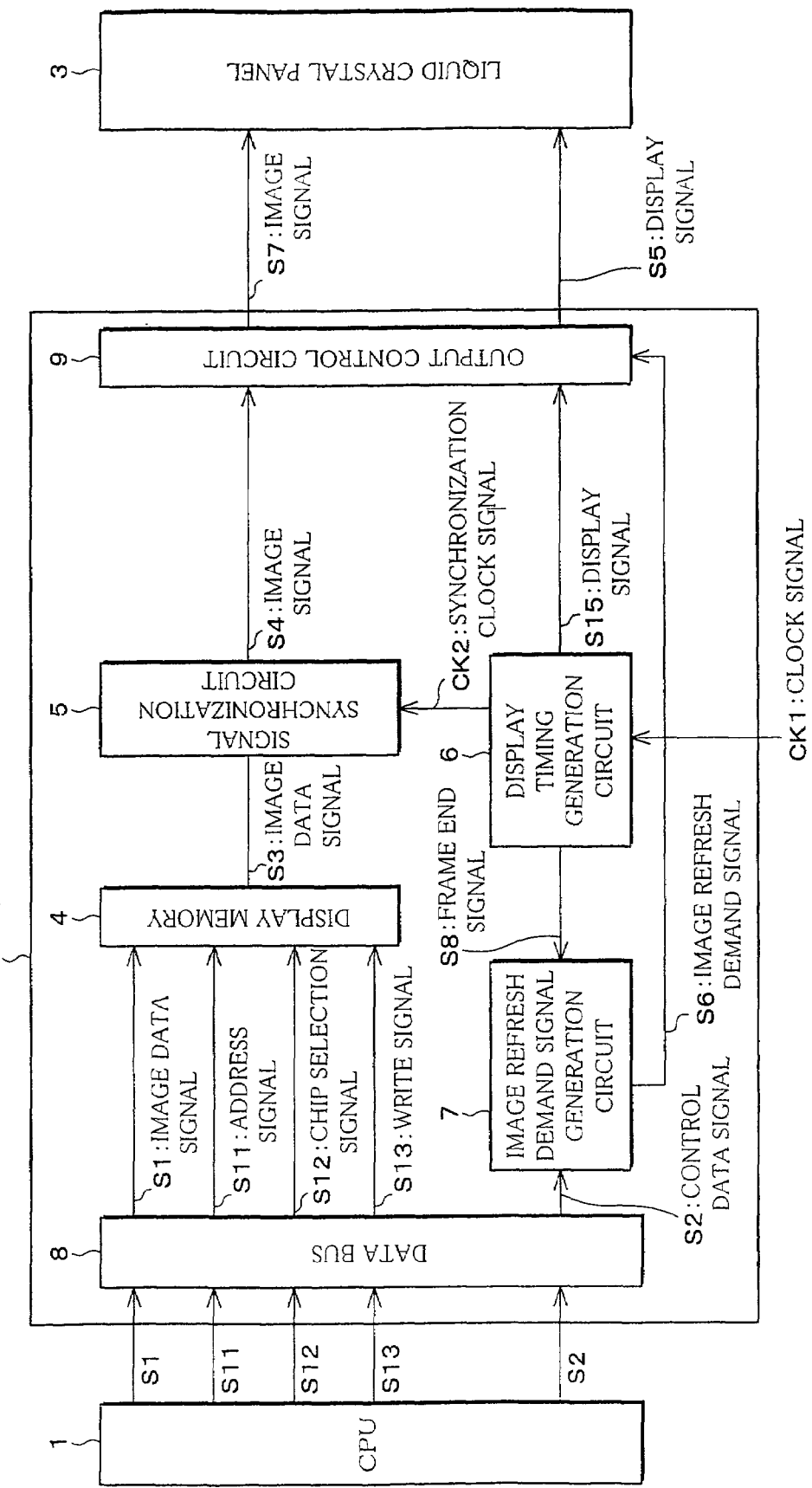
FIG. 1 is a block diagram schematically showing an arrangement of a display device according to an embodiment of the present invention.

As shown in the block diagram of FIG. 1, a display device of the present embodiment includes a CPU (an image data input section, a discrimination section, and a control data generation section) 1, a liquid crystal controller 2 as a display control section, and a liquid crystal panel 3 as a capacitive display element. The liquid crystal controller 2 includes a display memory 4, a signal synchronization circuit (output section) 5, a display timing generation circuit 6, an image refresh demand signal generation circuit (refresh rate control section) 7, a data bus 8, and an output control circuit (output control section) 9.

Figure 4:
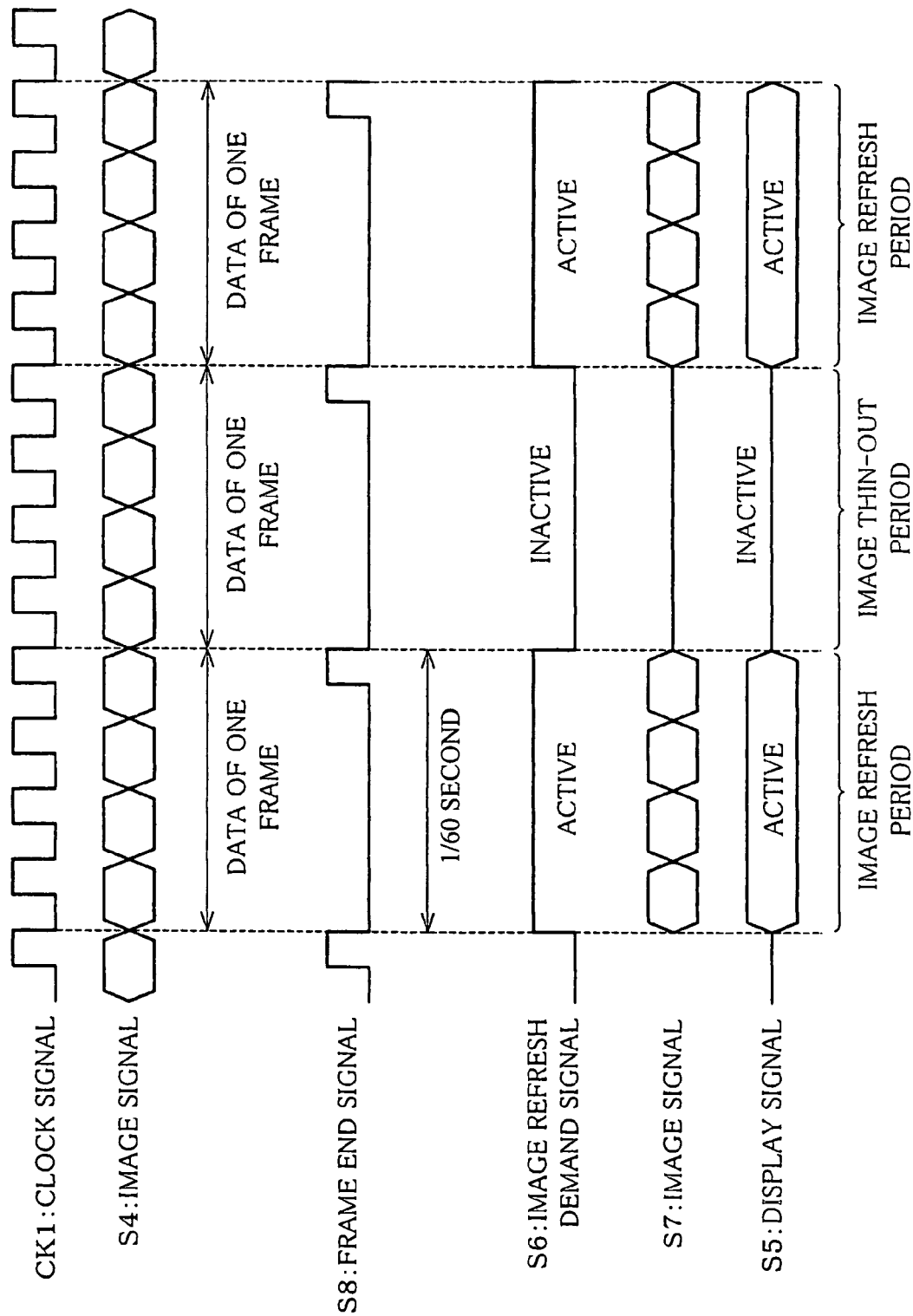
FIG. 4 is a drawing showing a plurality of waveforms adopted for the display device.

The following will explain operation of the foregoing display device with reference to FIGS. 1 and 4. Note that, FIG. 4 is a timing chart showing an example of signals used for the display device of the present embodiment. The timing chart shows the case where the frame period of an output image signal of the signal synchronization circuit 5 is 1/60 second, and n=1 and m=1 (n and m will be described later).

Firstly, the CPU 1 generates image data of a moving image or a still image which is to be displayed in the liquid crystal panel 3. Here, the CPU 1 generates an image data signal (image data) S1 which is made up of RGB signals for each pixel (dot) of the liquid crystal panel 3, and an address signal S1 which indicates an address (address in which the RGB signals of each pixel is written) of the display memory 4 in the liquid crystal controller 2, corresponding to each pixel. Further, the CPU 1 sends out the generated image data signal S1 and the address signal S11 to the liquid crystal controller 2.

Further, the CPU 1 also sends out a chip selection signal S12 and a write signal S13 to the display memory 4. The chip selection signal S12 selects one of two memory chips in the display memory 4 for writing data. The write signal S13 controls ON/OFF of the writing operation of the image data signal S1 to the display memory 4. Further, the CPU 1 activates these chip selection signal S12 and write signal S13 when the image data signal S1 and the address signal S11 are sent to the display memory 4 (the CPU 1 deactivates these signals in other cases). Here, the image data signal S1 and the address signal S11 are generated and sent to the display memory 4 one frame at a time.

The CPU 1 sends the image data signal S1 to the display memory 4 at the same time intervals the image data signal S1 is generated by the CPU 1. Therefore, the time intervals for sending out the image data signal S1 differs depending on whether the image data signal S1 is a still image or a moving image.

More specifically, the CPU 1 generates only one image data signal S1 for a single still image. Accordingly, for example, in the case of displaying a plurality of still images by switching them as in the case of a slide show, the image data signal S1 is sent out to the display memory 4 at the time intervals the still images are switched, in other words, at the time intervals the image data signal S1 of the still image is generated. The time intervals for switching still images are longer than the frame period of a moving image. Normally, the time intervals for switching still images are not less than 1/10 second. Therefore, the time intervals for sending out the image data signal S1 of the still image from the CPU 1 to the display memory 4 are also longer than the frame period of a moving image, i.e., normally at or longer than 1/10 second.

Meanwhile, the CPU 1 generates the image data signal S1 of a moving image one frame at a time at a constant period corresponding to the frame frequency of the generated image data signal S1. For example, the image data signal S1 of a moving image of 15 to 20 frames per second is generated one frame at a time at the intervals of 1/20 second to 1/15 second (15 times to 20 times per second). Accordingly, the image data signal S1 of a moving image is sent out from the CPU 1 to the display memory 4 at constant intervals corresponding to the frame frequency of the image data signal S1, for example, at the intervals of 1/20 second to 1/15 second (15 times to 20 times per second) in the case of an image data signal S1 of a moving image of 15 to 20 frames per second.

Figure 3:
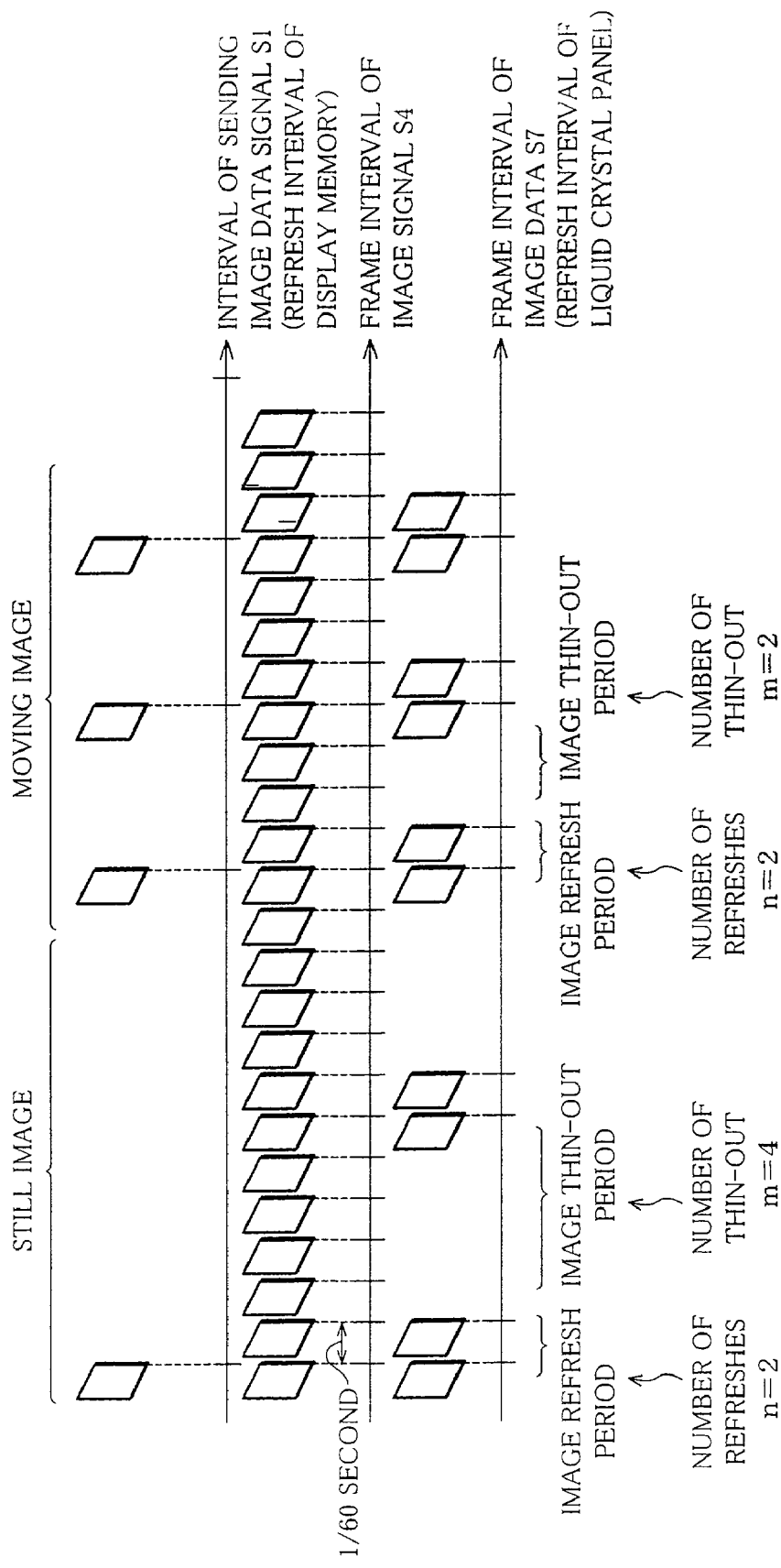
FIG. 3 is a diagram showing a variation of the number of frames (number of refreshes) of an image signal in the display device.

As described, in the case where the image data signal S1 is a moving image, the time intervals for sending out the image data signal S1 from the CPU 1 to the display memory 4 become shorter than the case where the image data signal S1 is a still image. For example, as shown in FIG. 3, the time intervals for sending out the image data signal S1 from the CPU 1 to the display memory 4 are 1/5 second in the case where the image data signal S1 is a moving image. On the other hand, the time intervals for sending out the image data signal S1 from the CPU 1 to the display memory 4 are 1/15 second in the case where the image data signal S1 is a still image. Note that, FIG. 3 is a diagram showing the number of frames in unit time, in the image data signal S1, image signal S4, and image signal S7. In the figure, a quadrilateral indicates one frame.

The CPU 1 discriminates whether the image data signal S1 is a still image or a moving image based on the duration of the time intervals for sending out the image data signal S1 from the CPU 1 to the display memory 4. More specifically, the CPU 1 judges that the image data signal S1 is a still image, when the time intervals for sending out the image data signal S1 from the CPU 1 to the display memory 4 are at or longer than a certain time period, and judges that the image data signal S1 is a moving image, when the time intervals for sending out the image data signal S1 from the CPU 1 to the display memory 4 are shorter than this time period. In the example of FIG. 3, whether or not the image data signal S1 is a still image or a moving image is decided according to whether the time intervals for sending out the image data signal S1 from the CPU 1 to the display memory 4 are at or longer than or shorter than 1/12 second.

Then, the CPU 1 determines the number of image refresh n and the number of image thin-out (the number of non-refreshes) m, according to the result of discrimination, namely, according to whether the image data signal S1 is a still image or a moving image. Note that, the number of image refreshes n is the number of times an image is refreshed during a time period in which the image signal S4 of one frame (n+m) is outputted. The number of image thin-out m is the number of times the image signal S4 is thinned out during a time period in which the image signal S4 of one frame (n+m) is outputted, in other words, the number of (n+m) frame periods of the image signal S4 in which the image is not refreshed.

Further, the CPU 1 generates a control data signal (control data) S2 which includes a data signal (an image refresh rate data signal S9 described later) indicating the number of image refreshes n, and a data signal (an image thin-out rate data signal S10 described later) indicating the number of image thin-out m. The CPU 1 outputs the control data signal S2 to the image refresh demand signal generation circuit 7, with the image data signal S1.

The image data signal S1 outputted from the CPU 1 is stored in the display memory 4 via the data bus 8. Here, the image data signal S1 is written on a memory chip in the display memory 4 which is specified by the chip selection signal S12, when the chip selection signal S12 and the write signal S13 are activated (when the image data signal S1 and the address signal S11 are sent out from the CPU 1). At this time, the image data signal S1 is written on an address of the display memory 4 specified by the address signal S11, with respect to each pixel signal (RGB signal corresponding to a color pixel).

Further, the image data signal S1 is written (buffered) to the display memory 4 of the liquid controller 2 at the same time intervals at which the image data signal S1 is sent from the CPU 1 to the display memory 4. Accordingly, the refresh interval of the display memory 4 is relatively long, for example, at or longer than 1 second in the case where the image data signal S1 is a still image, and the refresh interval of the display memory 4 is relatively short, for example, 1/20 second to 1/15 second in the case where the image data signal S1 is a moving image.

Further, the control signal S2 outputted from the CPU 1 is stored in the image refresh demand signal generation circuit 7 via the data bus 8. The image data signal S1 stored in the display memory 4 is read out as the image data signal (image data) S3 from the display memory 4, then is sent out to the signal synchronization circuit 5.

Note that, inputting the image data signal S1 from the CPU 1 to the display memory 4, and sending the image data signal S3 stored in the display memory 4 to the liquid crystal panel 3, are totally independent from each other. Thus, refreshing images in the liquid crystal panel 3 is totally independent from writing the image data signal S1 from the CPU 1 to the display memory 4. For example, when displaying a still image, once the image data signal S1 is written on the display memory 4, another writing from the CPU 1 to the display memory 4 will not be performed until a different image is inputted. In contrast, the image refresh of the liquid crystal panel 3 is repeatedly performed at the time intervals according to the display characteristics of the liquid crystal panel 3, even when displaying a single still image for extended period of time.

A clock signal CK1 shown in FIG. 4 is externally inputted to the display timing generation circuit 6 of the liquid crystal controller 2. The display timing generation circuit 6 generates a display signal S15 for driving the liquid crystal panel 3, according to the clock signal CK1. The display signal S15 is a timing signal which indicates a timing for outputting each frame of the image signal S4, so as to capture the image signal S4 in the liquid crystal panel 3 one frame at a time. The display signal S15 is always outputted per one frame (screen) period of the image signal S4 (described later). The display signal S15 is a periodic signal having the same period (a period of 1/60 second) as a frame period (image refresh frequency) of a common moving image (a video signal in the NTSC mode). Further, the display timing generation circuit 6 generates a synchronization clock signal CK2 for synchronizing the image data signal S3 with the display signal S5. The display timing generation circuit 6 respectively outputs the display signal S15 to the output control circuit 9, and the synchronization clock signal CK2 to the signal synchronization circuit 5, at the same period (a period of 1/60 second) as a frame period (image refresh frequency) of a common moving image. Note that, the clock signal CK1 and the synchronization clock signal CK2 are identical, and the both are system clocks for driving the liquid crystal controller 2.

Further, the display timing generation circuit 6 outputs a frame end signal S8 shown in FIG. 4 to the image refresh demand signal generation circuit 7, at the end of each frame of the display signal S15 (at the end of each frame of the image signal S4). The frame end signal S8 is a signal for informing the end of a frame (screen) of the image signal S4, and is outputted when the last pixel signal of the image signal S4 of a frame (screen) is sent out to the output control circuit 9.

The signal synchronization circuit 5 buffers the image data signal S3 read out from the display memory 4, and outputs the image data signal S3 according to the synchronization clock signal CK2 to the output control circuit 9 as the image signal S4 which has the same frame period (a period of 1/60 second) as the a frame period of a common moving image (an video signal in the NTSC mode) shown in FIG. 4,. The image signal S4 is outputted in phase with the display signal S5. Note that, the image data signal S1, the image data signal S3, and the image signal S4 are data of R, G, B corresponding to each pixel of the liquid crystal panel 3, and they indicates the same data but are asynchronous.

The image refresh demand signal generation circuit 7 generates an image refresh demand signal S6 from the control data signal S2 inputted from the CPU 1, and the frame end signal S8 outputted from the display timing generation circuit 6, and then outputs the image refresh demand signal S6 to the output control circuit 9. As shown in FIG. 4, the image refresh demand signal S6 is a signal which is active during the image refresh period, and is inactive during the image thin-out period (non image refresh period).

The output control circuit 9 outputs the image signal S4 and the display signal S15 only when the image refresh demand signal S6 inputted from the image refresh demand signal generation circuit 7 is active (i.e., in the image refresh period). As a result, as shown in FIG. 4, the image signal S7 outputted from the output control circuit 9 becomes a signal with an image thin-out period which corresponds to the image thin-out period of the image signal S4. Further, the display signal S5 outputted from the output control circuit 9 becomes a signal with an image thin-out period which corresponds to the image thin-out period of the display signal S15. Consequently, as shown in FIG. 4, the display signal S5 is active during the image refresh period, and is inactive during the image thin-out period.

In the liquid crystal panel 3, based on the image signal S7 and the display signal S5, a driving voltage according to the image signal S7 is applied to pixels during the period in which the display signal S5 is active (image refresh period). Meanwhile, the driving voltage is not applied to pixels during the period in which the display signal S5 is inactive (image thin-out period). As a result, it becomes possible to reduce power consumption as compared with the case (FIG. 8) where image refresh is performed at the time intervals ($1/60$ second) which are the same as the frame period of a common moving image, since the driving voltage is not applied to pixels during the image thin-out term.

Figure 2:
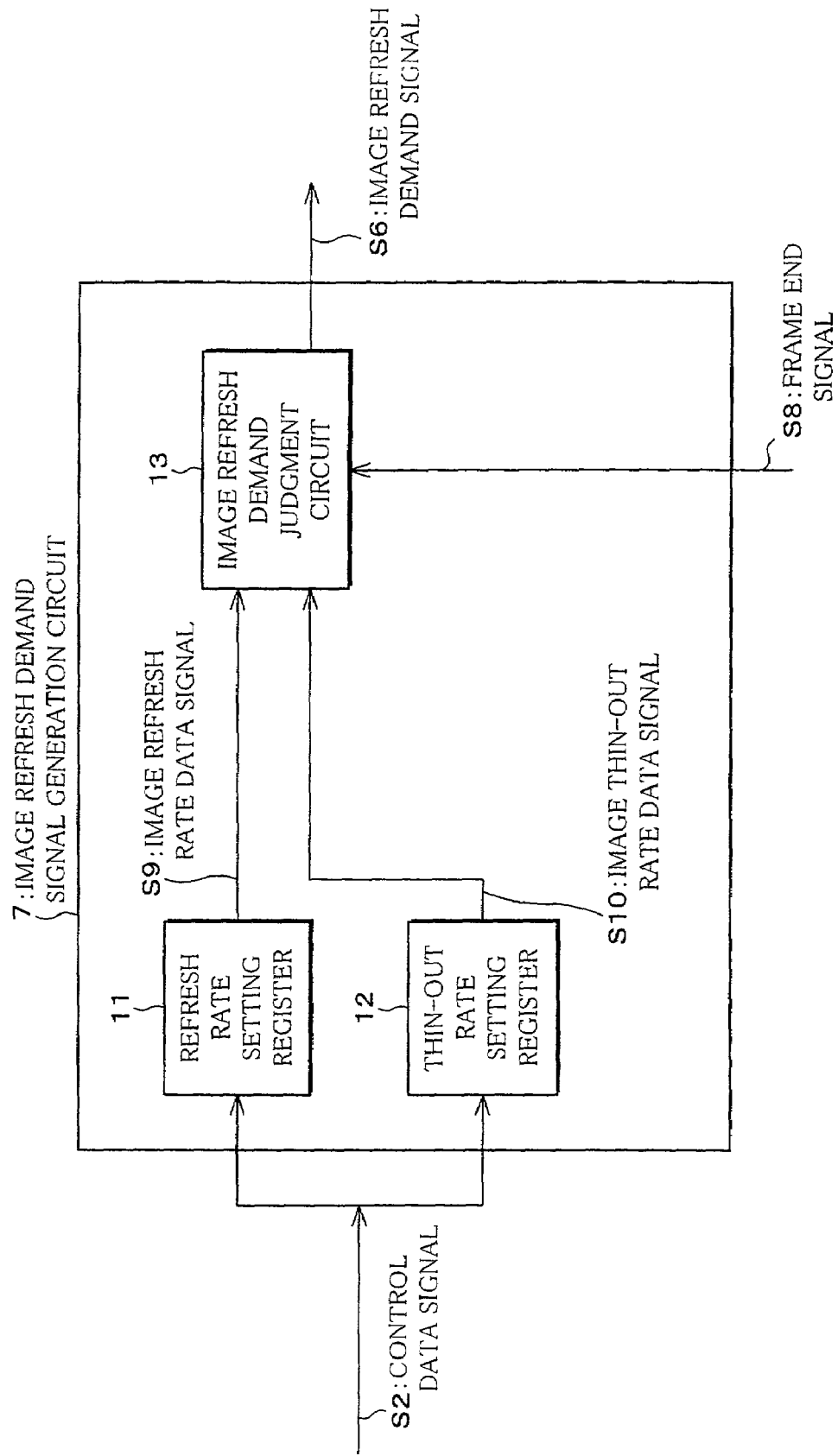
FIG. 2 is a block diagram schematically showing an arrangement of an image refresh demand signal generation circuit included in the display device.

Next, the following will explain an example of an arrangement of the image refresh demand signal generation circuit 7 in detail, with reference to FIG. 2.

As shown in FIG. 2, the image refresh demand signal generation circuit 7 includes a refresh rate setting register 11, a thin-out rate setting register 12, and an image refresh demand judgment circuit (timing instructing section) 13.

Firstly, a control data signal S2 which includes a data signal (an image refresh rate data signal S9) indicating the number of image refreshes n, and a data signal (an image thin-out rate data signal S10) indicating the number of image thin-out m, is inputted from the CPU 1 to the image refresh demand signal generation circuit 7 via the data bus 8.

Secondly, in the image refresh demand signal generation circuit 7, the image refresh rate data signal S9 and the image thin-out rate data signal S10, which are included in the control data signal S2, are respectively stored (set) in the image refresh rate setting register 11 and the thin-out rate setting register 12. These data signals S9 and S10 are stored (set) in the registers 11 and 12, for example, by latching the signals with a system clock, or, by latching the signals at the edge of a write clock which has been separately provided.

Further, the image refresh rate data signal S9 and the image thin-out rate data signal S10 are inputted to the image refresh demand judgment circuit 13. The image refresh demand judgment circuit 13 determines the number of image refreshes n and the number of image thin-out m according to the values of the image refresh rate data signal S9 and the image thin-out rate data signal S10 (the values set by the image refresh rate setting register 11 and the thin-out rate setting register 12), respectively. The image refresh demand judgment circuit 13 has a counter (not shown) for counting the frame end signal S8, and the image refresh demand judgment circuit 13 outputs the image refresh demand signal S6 until the value of the counter matches the number of image refreshes n. When the value of the counter matches the number of image refreshes n, the image refresh demand judgment circuit 13 deactivate the image refresh demand signal S6 while resetting the counter, and then starts counting the frame end signal S8 again. The image refresh demand signal S6 stays deactivated until the value of the counter matches the number of image thin-out m. When the value of the counter matches the number of image thin-out m, the image refresh demand judgment circuit 13 resets the counter, and then activates the image refresh demand signal S6. The image refresh demand judgment circuit 13 repeats these procedures so as to periodically activate and deactivate the image refresh demand signal S6. Further, the active period of the image refresh demand signal S6 is equal to n times the period of the frame end signal S8, in other words, m times the frame period of the image signal S4. Conversely, the inactive period of the image refresh demand signal S6 equal to m times the period of the frame end signal S8, in other words, n times the frame period of the image signal S4.

Accordingly, the liquid crystal panel 3 alternately performs image refresh for the time period equals to n times the frame period ($1/60$ second) of the image signal S4, and image non-refresh for the time period equals to m times the frame period ($1/60$ second) of the image signal S4.

Further, the image refresh demand judgment circuit 13 has a mask function which uses an image refresh demand signal which is always active, and masks (deactivates) a portion of the image refresh demand signal for a time period which corresponds to the image non-refresh period, so as to generate the image refresh demand signal S6 which is active only in part.

The following will explain how n and m are set when displaying a still image and when displaying a moving image, with reference to FIG. 3.

FIG. 3 is a timing chart showing the frame intervals of the image data signal S1, the image signal S4, and the image signal S7, when displaying a still image and displaying a moving image. As shown in FIG. 3, the number of refreshes of the display memory (the number of times the image data signal S1 of one frame is sent) is one, when displaying a still image.

In the present embodiment, n and m when displaying a still image and n and m when displaying moving image are set so that n/m when displaying a still image is smaller than n/m when displaying a moving image. In the example of FIG. 3, n=2, and m=4 when displaying a still image, and n=2, and m=2 when displaying a still image.

Thus, the number of image refreshes in unit time when displaying a still image is smaller than the number of image refreshes in unit time when displaying a moving image. In FIG. 3, the number of image refreshes in unit time when displaying a moving image is 30, whereas the number of image refreshes in unit time when displaying a still image is 20. This prevents extra power consumption due to unnecessary image refreshes when displaying a still image, thereby reducing power consumption.

Further, it is desirable to make the image refresh intervals of the liquid crystal panel 3 when displaying a still image as long as possible to reduce power consumption; however, there is an upper time limit that the liquid crystal panel 3 can hold the image. Namely, it is required to perform the image refresh of the liquid crystal panel 3 according to the image holding characteristics (a rate at which charge escapes) of the liquid crystal panel 3. For example, in order to keep displaying a single still image, it is required to perform the image refresh (applying a driving voltage) by repeatedly sending out the same image signal to the liquid crystal panel 3 at the intervals longer than a certain time period (image holding time). Therefore, the upper limit of the image refresh should be determined according to the image holding characteristic of the liquid crystal panel 3 so that it becomes shorter than the image holding time of the liquid crystal panel 3. In one example of the liquid crystal panel 3 which is commercially available, the image holding time is about $1/20$ second. However, a liquid crystal panel 3 which is currently under development holds promise of improving the image holding time to about $1/5$ second.

Considering the facts described, in the foregoing liquid crystal panel 3 which is commercially available, n and m should respectively be set to about n=1 and m=2 when displaying a still image, assuming that the frame period of the image signal S4 is 1/60 second (60 frames per second). By thus setting n and m, the image refresh rate when displaying a still image becomes three times the frame period of the image signal S4, i.e., about 1/20 second. Thus, the image signal S4 of a still image can be thinned out to 1/3, and the image refresh rate when displaying a still image becomes 20 times per second. Further, in the liquid crystal panel 3 whose image holding time is 1/5 second, n and m should be set to about n=1 and m=11 when displaying a still image, assuming that the frame period of the image signal S4 is 1/60 second (60 frames per second). By thus setting n and m, the image refresh interval when displaying a still image becomes twelve times the frame period of the image signal S4, i.e., about 1/5 second. Thus, the image signal S4 of a still image can be thinned out to 1/12, and the image refresh rate when displaying a still image becomes 5 times per second.

On the other hand, it is desirable to make the image refresh intervals of the liquid crystal panel 3 when displaying a moving image as long as possible to reduce power consumption; however, for a smooth display of the moving image, the intervals should be more desirably shorter than the frame period of the image data signal S1 which is sent out from the CPU 1 to the display memory 4. In order to meet this condition, the image refresh interval when displaying a moving image is required to be no longer than 1/20 to 1/15 second, when the frame period of the image data signal S1 which is sent out from the CPU 1 to the display memory 4 is 1/20 to 1/15 second (15 to 20 frames per second).

Considering the facts described, in the foregoing liquid crystal panel 3 which is commercially available, n and m should respectively be set to about n=1 and m=2 when displaying a moving image (however, n/m must be greater than the case of displaying a still image), assuming that the frame period of the image signal S4 is 1/60 second (60 frames per second). By thus setting n and m, the image refresh interval when displaying a moving image becomes three times the frame period of the image signal S4, i.e., about 1/20 second. Thus, the image signal S4 of a moving image can be thinned out to 1/3, and the image refresh rate when displaying a moving image becomes 20 times per second.

Further, in order to suppress flicker of the displayed image of the liquid crystal panel 3, it is further preferable that plural times of refreshes are performed one after another in the both cases of displaying a moving image and displaying a still image. Namely, n should be not less than 2. Thus, as an example, it is further preferable that the number of image refreshes n is set to 2 or 3, and the number of image thin-out m is set to about 5.

Figure 7:
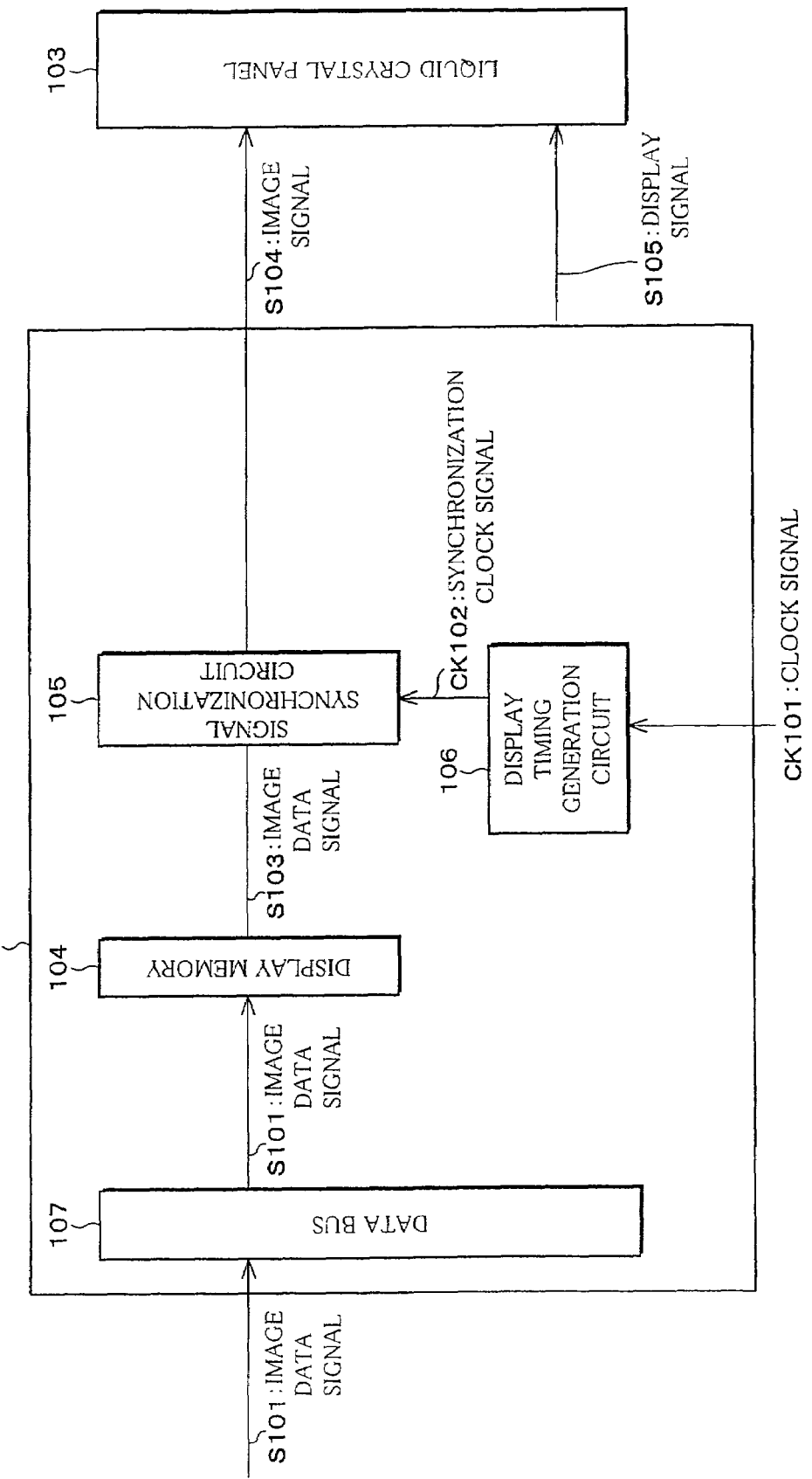
FIG. 7 is a block diagram schematically showing an arrangement of a conventional display device.

Note that, unlike the conventional display device shown in FIG. 7, the display device of the present embodiment does not change the image refresh frequency of the liquid crystal panel 103 by changing the frequencies of the image signal S104 and the display signal S105 which are outputted from the liquid crystal controller 102 to the liquid crystal panel 103. The display device of the present embodiment can change the image refresh frequency of the liquid crystal panel 3 by the CPU 1 in a structure of the liquid crystal controller 2 including:

the refresh rate setting register 11 and the thin-out rate setting register 12 which are accessible from the CPU 1;

the image refresh demand judgment circuit 13 for generating the image refresh demand signal S6 which becomes active only during the image refresh period, according to the frame end signal S8 which is periodically generated according to the number of image refreshes n and the number of image thin-out m which are set by the registers 11 and 12, respectively; and the output control circuit 9 which enables/disables the output of the image signal S4 to the liquid crystal panel 3 based on the image refresh demand signal S6.

Further, as described in the embodiment above, the CPU 1 has a function for discriminating whether the image data signal S1 is a moving image or a still image. However, this function can be included in the liquid crystal controller 2. Namely, it is possible to discriminate whether the image data signal S1 is a moving image or a still image by the liquid crystal controller 2 based on transfer intervals (time intervals for refreshing images) of the image data signal S1 when it is transferred from the CPU 1 to the display memory 4.

[Second Embodiment]

Figure 5:
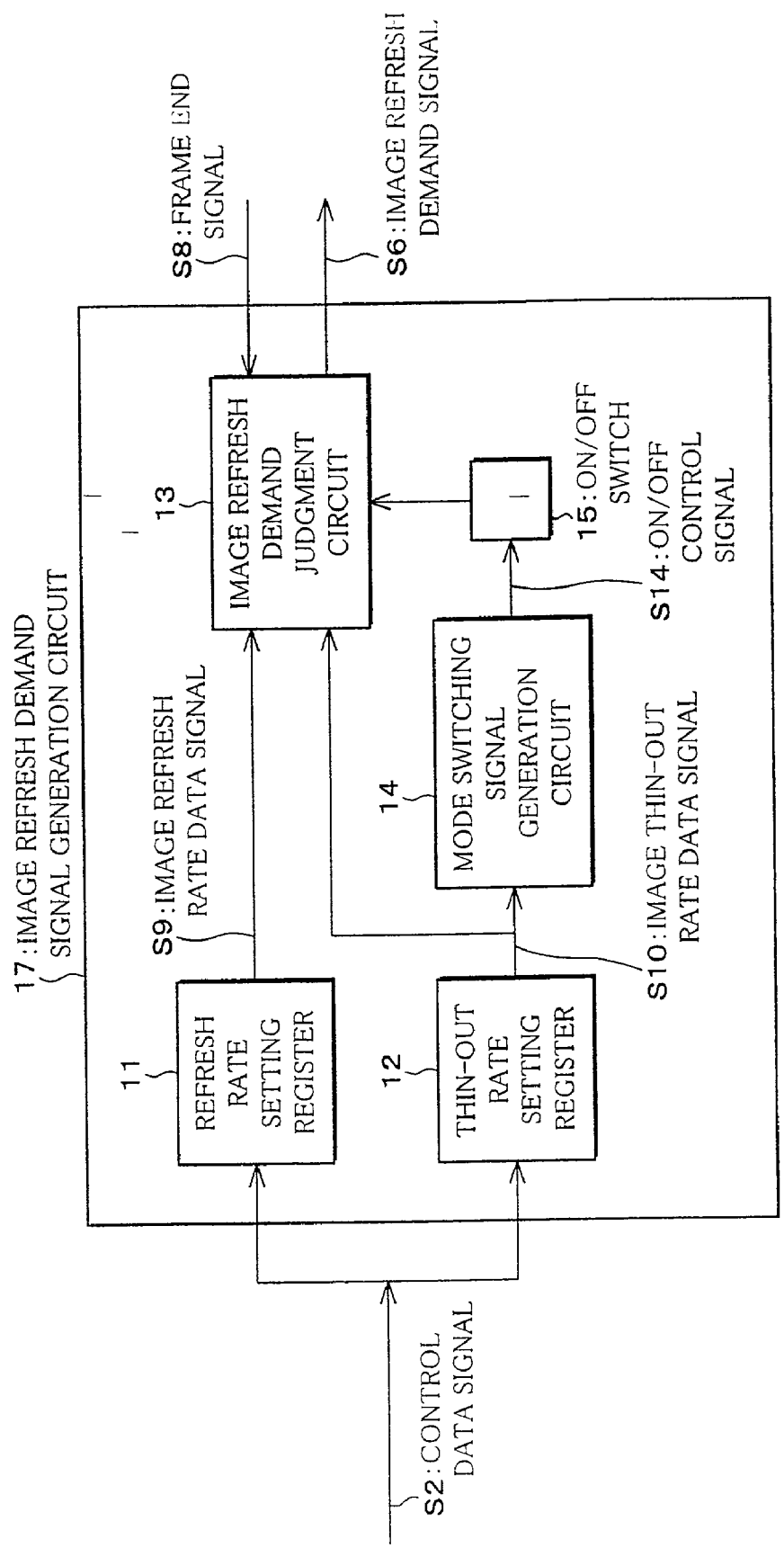
FIG. 5 is a block diagram schematically showing an arrangement of an image refresh demand signal generation circuit included in a display device according to another embodiment of the present invention.
Figure 6:
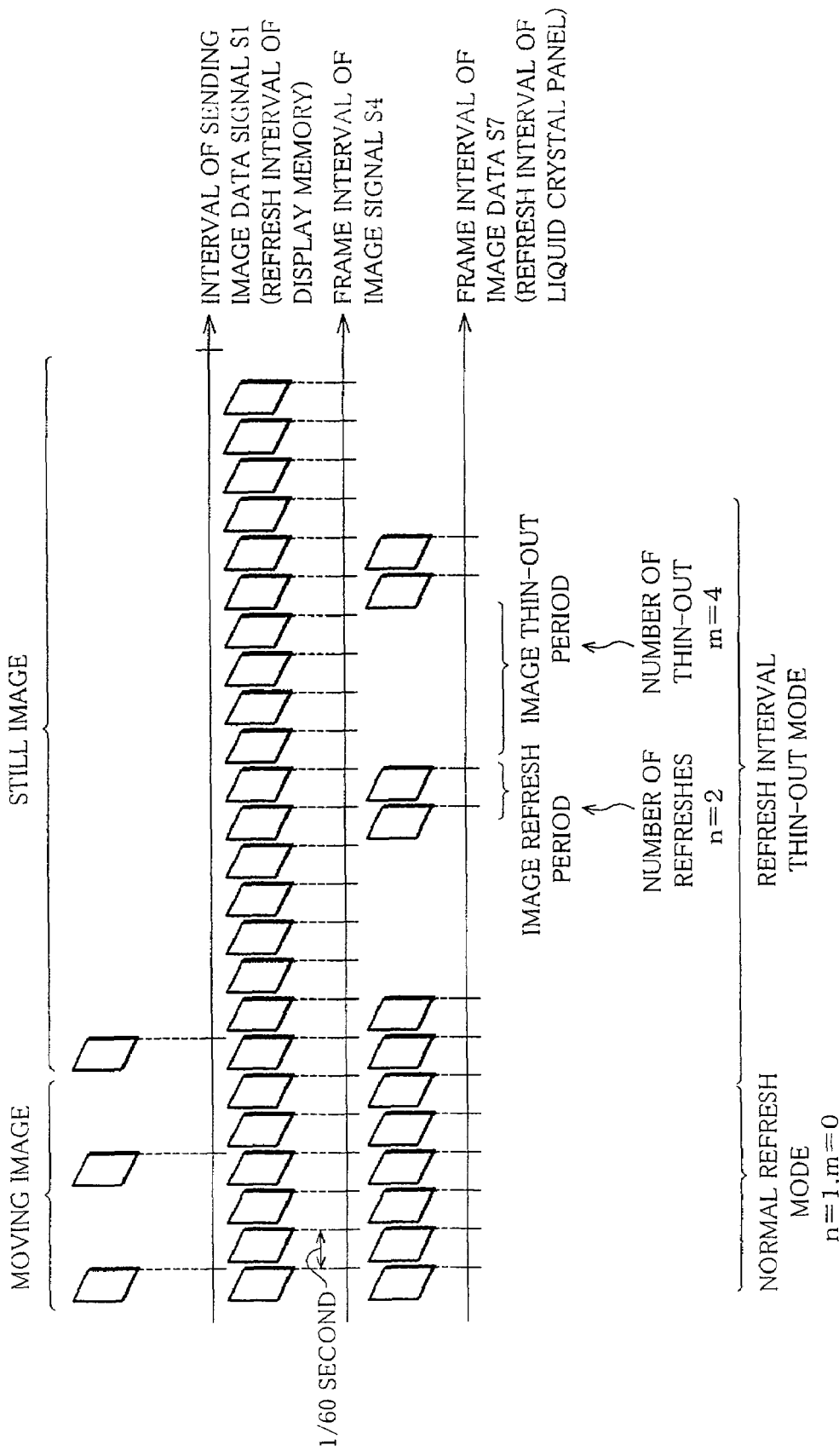
FIG. 6 is a diagram showing a variation of the number of frames (number of refreshes) of an image signal in the display device of FIG. 5.

The following will explain another embodiment of the present invention with reference to FIG. 5 and FIG. 6. For ease of explanation, components having the same functions as those shown in the drawings pertaining to the first embodiment above will be given the same reference symbols, and explanation thereof will be omitted here.

A liquid crystal display of the present embodiment has the same arrangement as that of the first embodiment, except for an image refresh demand signal generation circuit 17 which is provided as an image refresh rate control section, instead of the image refresh demand signal generation circuit 7. As shown in FIG. 5, the image refresh demand signal generation circuit 17 further includes a mode switching signal generation circuit (operation control section) 14, and an ON/OFF switch 15 (operation control section) for switching on/off the operation of the image refresh demand judgment circuit 13, in addition to the functions of the image refresh demand signal generation circuit 7.

The mode switching signal generation circuit 14 switches off the ON/OFF switch 15 when the ratio (m/n) between the number of image thin-out m and the number of image refreshes n is at or smaller than a predetermined value, and switches on the ON/OFF switch 15 when the ratio (m/n) between the number of image thin-out m and the number of image refreshes n is greater than the predetermined value, based on at least either one of the number of image thin-out m set by the image thin-out rate data signal S10, or the number of image refreshes n set by an image refresh rate data signal S9. With this function, the image refresh demand judgment circuit 13 stops operating when the ratio (m/n) between the number of image thin-out m and the number of image refreshes n is at or smaller than the predetermined value, and the image refresh demand judgment circuit 13 starts operating when the ratio (m/n) between the number of image thin-out m and the number of image refreshes n is greater than the predetermined value.

In the example of FIG. 5, the mode switching signal generation circuit 14 stops the operation of the image refresh demand judgment circuit 13 when the ratio (m/n) between the number of image thin-out m and the number of image refreshes n is 0, and starts the operation of the image refresh demand judgment circuit 13 when the ratio (m/n) between the number of image thin-out m and the number of image refreshes n is not 0. In this case, regardless of the value of the number of image refreshes n, the ratio (m/n) between the number of image thin-out m and the number of image refreshes n will always be 0 as long as the number of image thin-out m is 0. Accordingly, in the example of FIG. 5, the mode switching signal generation circuit 14 controls the operation of the image refresh demand judgment circuit 13 based on only the number of image thin-out m set by the refresh rate setting register 11.

With the foregoing arrangement, it becomes possible to operate the liquid crystal controller 2 in two modes by switching the modes. Namely, the liquid crystal controller 2 stops the operation of the image refresh demand judgment circuit 13 when the ratio (m/n) between the number of image thin-out m and the number of image refreshes n is at or smaller than a predetermined value, and outputs the image signal S4 directly to the liquid crystal panel 3 so as to operate in a mode (normal refresh mode) in which images of the liquid crystal panel 3 are refreshed at normal refresh intervals (1/60 second). On the other hand, the liquid crystal controller 2 starts the operation of the image refresh demand judgment circuit 13 when the ratio (m/n) between the number of image thin-out m and the number of image refreshes n is greater than the predetermined value, and thins out the image signal S4, so as to operate in a mode (refresh interval thin-out mode) in which images of the liquid crystal panel 3 are refreshed at refresh intervals which are longer than the normal refresh intervals.

FIG. 6 is a timing chart of the normal refresh mode and the refresh interval thin-out mode, which are switched between still image display and moving image display. In this case, the number of image thin-out m is set to 0, and the number of image refreshes n is set to 1 when displaying the moving image. Also, the number of image thin-out m is set to 4, and the number of image refreshes n is set to 2 when displaying the still image.

In the case above, since the number of image thin-out m is set to 0 when displaying a moving image, the mode switching signal generation circuit 14 stops the operation of the image refresh demand judgment circuit 13, and switches the mode to the normal refresh mode. As described, the image refresh demand judgment circuit 13 has the function (masking function) of masking the image non-refresh period of an image refresh demand signal which is always active. Therefore, this mask function does not work while the operation of the image refresh demand judgment circuit 13 is stopped, and the image refresh demand constantly arises. Namely, the image refresh demand signal S6 is always active while the operation of the image refresh demand judgment circuit 13 is stopped. Consequently, the image signal S4 is constantly outputted in the normal refresh mode.

On the other hand, since the number of image thin-out m is set to 4 when displaying a still image, the mode switching signal generation circuit 14 starts the operation of the image refresh demand judgment circuit 13, and switches the mode to the refresh interval thin-out mode. In the refresh interval thin-out mode, the image refresh demand judgment circuit 13 masks the image non-refresh period of an image refresh demand signal which is always active, as with the first embodiment.

In this manner, unnecessary operation of the image refresh demand judgment circuit 13 can be prevented when the number of image thin-out m is set to 0, thereby reducing power consumption.

Normally, the value is externally set by using the ON/OFF switch 15 as a register; however, it can also be set by the mode switching signal generation circuit 14 which controls the ON/OFF switch 15 according to the value of the thin-out rate setting register 12. In this way, an extra register will not be required.

Note that, in the example of FIG. 5, the operation of the image refresh demand judgment circuit 13 is controlled based on only the number of image thin-out m; however, provided that the operation of the image refresh demand judgment circuit 13 according to a change of the ratio between the number of image thin-out m and the number of image refreshes n can be controlled, the operation of the image refresh demand judgment circuit 13 may be controlled based on other information. Namely, the operation of the image refresh demand judgment circuit 13 can be controlled based on only the number of image refreshes n, or based on both the number of image thin-out m and the number of image refreshes n.

A display device of the present invention preferably includes:

an output section which outputs an image signal for refreshing the images displayed in a capacitive display element at certain intervals;

an output control section which transfers the image signal outputted from the output section to the capacitive display element while thinning out a part of the image signal;

a control data generation section which generates control data which indicates integer values m and n of an integer ratio m/n which is a ratio between the number of thin-out the image signal and the number of transfers of the image signal (number of thin-out/number of transfers) in the output control section; and a timing instructing section which instructs the transfer timing of the image signal to the output control section according to the control data, wherein the control data generation section generates the control data so as to change the integer ratio, based on a result of discrimination by the discrimination section.

With the foregoing arrangement, it becomes possible to further reduce power consumption of the entire display device, because the output control section thins out the image signal of certain time intervals (for example, an image signal of a moving image having a frame period of 1/60 second as with a common television video signal), and varies the ratio (number of thin-out/number of transfers) for thinning out the image signal varies depending on the type of the image data. Further, with the foregoing arrangement, since the transfer timing of the image signal is varied, it becomes possible to freely control the image refresh timing compared with the case of changing the frequency of the transferred image signal. Thus, it is possible to refresh images one after another plural times, for example, so as to suppress flicker of the displayed image of the display element.

Note that, the output section, the output control section, and the timing instructing section in the foregoing arrangement can be realized by a liquid crystal controller including a memory for holding image data and a circuit section for setting a rate of sending out the image data (image refresh rate) from the memory to the capacitive display element.

In the display device having the foregoing arrangement, it is preferable that the refresh rate control section further includes an operation control section which stops operation of the timing instructing section when the integer ratio m/n is not more than a predetermined value, according to at least either the integral value m or n, so as to directly transfer an image signal outputted from the output section to the capacitive display element. Namely, it is preferable that the refresh rate control section further includes an operation control section which switches to a mode in which the operation of the timing instructing section is stopped and images are refreshed at normal refresh intervals according to the image signal outputted from the output section, from a mode in which images are refreshed at a slower image refresh rate by thinning out the image signal outputted from the output section according to at least either one of the integral values m and n, when the integral ratio m/n is not more than a predetermined value.

In the display device of the present invention, when the integer value m/n is small, in other words, the ratio to thin out the image signal is low, the reduction of power consumption by thinning out the image signal becomes relatively low. Consequently, the power consumed by operating of the timing instructing section will be larger than the reduction, and power consumption of the entire display device will possibly increase, opposing the intention.

The operation control section stops the operation of the timing instructing section, and directly transfers the image signal outputted from the output section to the capacitive display element when the ratio for thinning out the image signal is small as in the case above. This makes it possible to prevent an increase of power consumption of the entire device caused by the operation of the timing instructing section, thereby further reducing power consumption of the entire device.

Note that, it is preferable that the display control section includes a storage section for storing the image data so as to individually and arbitrarily control input intervals and output intervals of the image data.

Further, it is preferable that the refresh rate control section sets the image refresh rate in the capacitive display element higher than the number of frames of the image data, for a smooth display of a moving image.

Further, it is preferable that the refresh rate control section sets the image refresh rate as low as possible within a range that the capacitive display element can hold the display image, when the image data is recognized as a still image. Namely, it is preferable that the image refresh interval when the image data is a still image is set to the highest value at which the capacitive display element can hold the display image without problems, according to the image holding characteristics (data holding characteristics) of the capacitive display element.

Further, it is further preferable that the refresh rate control section refreshes images one after another for plural times in displaying both a moving image and a still image so as to suppress flicker of the displayed image of the display element. Accordingly, in the arrangement including the control data generation section which generates control data indicating the integer values m and n, it is preferable that n is not less than 2 and the output control section thins out the image data m times and transfers the image data n times alternately.

Note that, the capacitive display element is not limited to a liquid crystal display element. Any display elements (capacitive display elements), made up of pixels having a capacitive load, and capable of holding a displayed image for a certain period of time without applying a voltage to the pixels, can be adopted.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display device comprising:
a capacitive display element which displays an image;
a display control section which refreshes an image displayed in the capacitive display element according to image data;
an image data input section which inputs the image data to the display control section;
a discrimination section which discriminates a type of the image data based on an input time interval of the image data from the image data input section to the display control section;
a refresh rate control section which changes an image refresh rate of the image in the capacitive display element, according to a result of discrimination by the discrimination section;
an output section which outputs an image signal for refreshing the images displayed in the capacitive display element at certain intervals;
an output control section which transfers the image signal outputted from the output section to the capacitive display element while thinning out part of the image signal; and
a control data generation section which generates control data which indicates integer values m and n of an integer ratio m/n which is a ratio between a number of thin-out of the image signal and a number of transfers of the image signal, in the output control section, based on a result of discrimination by the discrimination section,
wherein:
the refresh rate control section comprising a timing instructing section which instructs a transfer timing of the image signal to the output control section (9) according to the control data.

2. The display device set forth in claim 1, wherein:
the discrimination section discriminates whether the image data is a still image or a moving image based on the input interval of the image data from the image data input section to the display control section.

3. The display device set forth in claim 2, wherein:
the discrimination section discriminates the image data as a still image when the input interval is equal to or longer than a predetermined interval, and the discrimination section discriminates the image data as a moving image when the input interval is shorter than the predetermined interval.

4. The display device set forth in claim 2, wherein:
the refresh rate control section is adopted so that, when the image data is discriminated as a moving image by the discrimination section, the image refresh rate of the capacitive display element becomes equal to or greater than an input rate of the image data from the image data input section to the display control section.

5. The display device set forth in claim 2, wherein:
the refresh rate control section determines the image refresh rate of the capacitive display element based on an image holding characteristic of the capacitive display element for holding the displayed image, when the image data is discriminated as a still image by the discrimination section.

6. The display device set forth in claim 1, wherein:
the output control section transfers and thins out the image signal in such a manner that an image transfer period and an image thin-out period are provided alternately.

7. The display device set forth in claim 1, wherein:
the refresh rate control section transfers the image signal one after another 2 times or more.

8. The display device set forth in claim 1, wherein:
the timing instructing section outputs an image refresh demand signal to the output control section based on the control data, and
the image refresh demand signal becomes active when the image signal is transferred, and becomes inactive when the image signal is thinned out.

9. The display device set forth in claim 8, wherein:
a driving voltage is applied to the capacitive display element when the image refresh demand signal is active, and a driving voltage is not applied to the capacitive display element when the image refresh demand signal is inactive.

10. The display device set forth in claim 8, wherein:
the timing instructing section outputs an active image refresh demand signal.

11. The display device set forth in claim 10, wherein:
the timing instructing section has a mask function which masks the active image refresh demand signal.

12. The display device set forth in claim 1, wherein:
the display control section comprises a storage section for storing the image data.

13. The display device set forth in claim 12, wherein:
the display control section independently controls the input interval and an output interval of the image data.

14. The display device set forth in claim 1, wherein:
the refresh rate control section further comprises an operation control section which stops operation of the timing instructing section, based on at least either one of the integer values m and n when the integer ratio m/n is at or smaller than a predetermined value, so as to directly transfer the image signal outputted from the output section to the capacitive display element.

15. The display device set forth in claim 14, wherein:
the refresh rate control section starts operation of the timing instructing section according to the operation control section when the integer ratio m/n is greater than the predetermined value, so as to thin out the image signal.

* * * * *